United States Patent

Newcomb

[15] 3,689,913

[45] Sept. 5, 1972

[54] CONVERSION TO A DIGITAL CODE WHICH IS SELF-CLOCKING AND ABSOLUTE PHASING

[72] Inventor: Gilbert Shelton Newcomb, Lake Pine, N.J.

[73] Assignee: RCA Corporation,

[22] Filed: April 17, 1970

[21] Appl. No.: 29,487

[52] U.S. Cl.......................340/347 DD, 340/174.1 H

[51] Int. Cl................................................G06f 3/00

[58] Field of Search........340/347, 174 A, 174.1 G, 174.1 H; 323/137; 325/39, 163

[56] References Cited

UNITED STATES PATENTS

| | | | |
|---|---|---|---|
| 3,454,718 | 7/1969 | Perreault | 325/163 |
| 3,206,678 | 9/1965 | Hannon | 325/163 |
| 3,271,588 | 9/1966 | Mine | 328/137 |
| 3,414,894 | 12/1968 | Jacoby | 340/347 |
| 3,142,723 | 7/1964 | Fleming | 178/66 A |

*Primary Examiner*—Maynard R. Wilbur
*Assistant Examiner*—Jeremiah Glassman
*Attorney*—Edward J. Norton

[57] ABSTRACT

An encoded binary signal which is self clocking and absolute phasing is provided by a method which provides a first pulse manifesting a first binary value having all transitions of the same predetermined polarity at bit interval boundaries and transitions of the opposite polarity intermediate the bit interval boundaries. A second pulse is provided having no transitions intermediate the interval boundaries and at least one transition in coincidence with one interval boundary thereof having the same predetermined polarity, the second pulse manifesting a second binary value. The presence or absence of a transition within a bit interval determines the binary value manifested by the pulse occuring in that interval and the time of occurrence of all transitions of the predetermined polarity identifies the time of occurrence of the interval boundaries of the signal.

8 Claims, 4 Drawing Figures

INVENTOR.
Gilbert S. Newcomb
BY
Edward J. Norton
ATTORNEY

INVENTOR.
Gilbert S. Newcomb
BY Edward J. Norton
ATTORNEY

CONVERSION TO A DIGITAL CODE WHICH IS SELF-CLOCKING AND ABSOLUTE PHASING

BACKGROUND OF THE INVENTION

The present invention relates to binary encoded signals which are self-clocking.

In the transmission of binary encoded signals, both phase and timing information need to be included in the transmitted signal to provide adequate synchronization of the signal to encoding and decoding systems. The timing information ensures that the duration of the bit intervals of the encoded signal match the duration of the bit intervals of the decoding systems, while the phasing information ensures that the time of occurrence of the boundaries of the bit interval or intervals, as the case may be, are correctly identified. In either case, differences between signal bit interval duration or time of occurrence of bit interval boundaries of the encoded signal and the corresponding interval duration or boundary occurrence in the decoding system will result in errors during the decoding process.

In both an encoding system and decoding system, timing information may be provided by a clock at each station or, in the alternative, be encoded into the transmitted signal. In either instance, the bit interval duration is matched to a predetermined duration throughout the transmission system. It is a simple matter to correlate the decoding system to this predetermined interval duration.

However, it is usually much more difficult to randomly identify the correct phase or the time of occurrence of the bit interval boundaries of a binary encoded signal. In some coding schemes, binary ones and zeros are readily identified by voltage levels regardless of bit interval boundary location and only the code words need to be correctly phased. However, in other coding schemes, such as in di-phase codes, it is the location of the transitions from one voltage level to another which identifies the binary value. In these latter schemes, transitions within bit intervals indicate one binary value and absence of transitions within bit intervals indicate a second binary value. Consequently, correct phase information needs to be provided for the bit interval boundaries, otherwise 180° out of phase conditions may arise. That is, transitions from one level to another do not by themselves indicate a binary value, but only in conjunction with respect to the bit interval boundaries. But, transitions in these codes by themselves also do not indicate positively the respective boundaries of the bit intervals. These transitions take place within the bit interval or at interval boundaries in random sequence and with random polarities. Thus, unless additional information is supplied, the bit interval boundaries are not readily identifiable.

In these latter coding schemes, preambles (synchronizing wave trains) are periodically provided in the encoded signal in order to check the phase. These preambles take up channel capacity and increase the bandwidth. The problem of maintaining correct phase magnifies when utilizing a magnetic medium which is subject to random physical deformities and therefore needs to be continually synchronized to the decoding system through servo control systems. But, regardless of the system used, due to the insertion of preambles or phase information in addition to the encoded signal in the latter mentioned codes, phase correlation is at best intermittent rather than continuous.

Accordingly, it is an object of the present invention to provide an improved binary encoded signal which is self-clocking and which provides nearly continuous phase information or absolute phasing without the aforementioned disadvantages.

SUMMARY OF THE INVENTION

Briefly, a method of generating a binary encoded signal is disclosed in which the signal is of the type representative of a series of bits occurring during contiguous intervals of equal duration.

For each interval of the encoded signal manifesting a first given binary value a pulse is provided having sharply rising and falling transient variations occurring between first and second levels. The pulses of all these intervals have the same given one of either the rising or falling transient variations occurring substantially in coincidence with an interval boundary corresponding to the pulse provided for that interval. The other transient variations occur intermediate the boundaries of the same corresponding intervals.

In addition, for each interval of the encoded signal manifesting a second binary value different from the given binary value a second pulse is provided having sharply rising and falling transient variations occurring between the first and second levels. Each of the second pulses for all the intervals have the respective rising and falling transient variations occurring substantially in coincidence with the interval boundaries corresponding to the interval for which that second pulse is provided.

Thus, a sharply rising and falling transient variation, as the case may be, of the same polarity regardless of the binary value of the bit form associated therewith occurs at least at alternate boundaries. Subsequent processing of the signal yields both clocking and phase information from the encoded signal, each bit form of which corresponds to one two predetermined binary values. Therefore, the need for phasing code words in addition to the data to be transmitted is eliminated.

DETAILED DESCRIPTION

Figure 1:
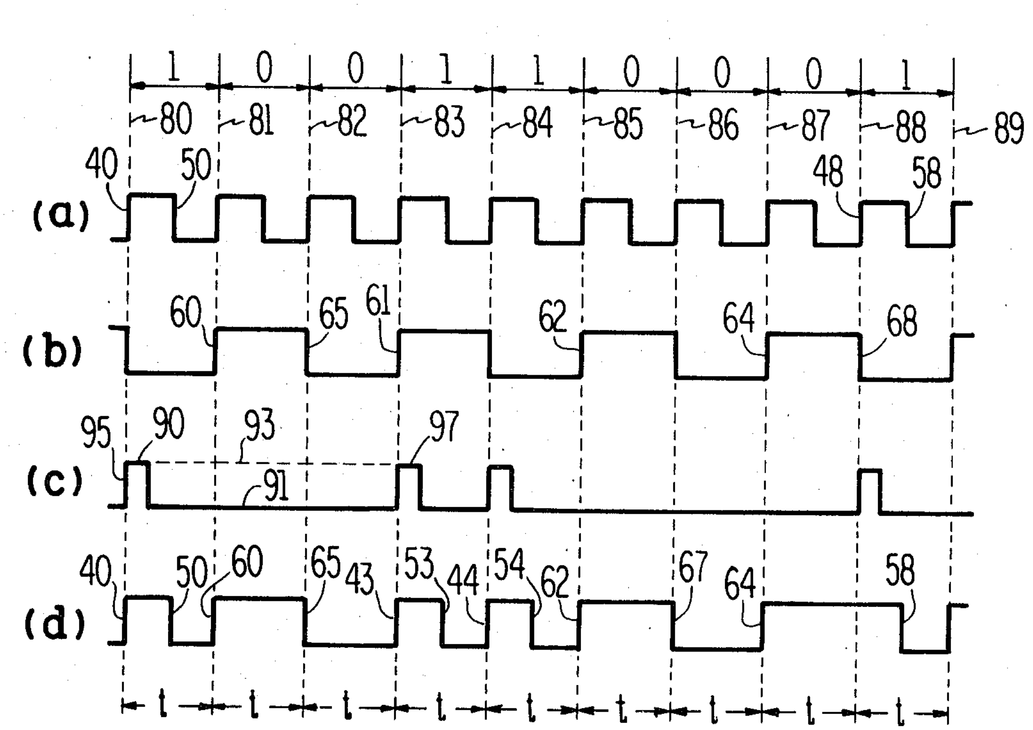
FIG. 1 is a chart of waveforms showing a binary encoded signal used as a control for generating an output information signal which is self-clocking and contains absolute phasing information.

The signals of FIGS. 1*a* and 1*b* illustratively shown as the basic waveforms which, when randomly combined in a manner to be described, form the binary encoded waveform of the present invention as illustrated by FIG. 1*d*. The waveform of FIG. 1*c* is an example of a binary encoded control signal which is utilized to control which respective one of the signals of FIGS. 1*a* and 1*b* are precessed to output terminal 30 of the circuit arrangement of FIG. 2, to be described, to form waveform *d* of FIG. 1.

Waveform *d* of FIG. 1 includes two basic bit forms each illustrated separately by the waveforms of FIGS. 1*a* and 1*b*. To simplify the description, the various waveforms of FIG. 1 will be sometimes referred to as waveforms 1*a*, 1*b*, 1*c*, or 1*d*, as the case may be.

The encoded signal of FIG. 1d exhibits the following characteristics:

a. All transitions of a predetermined polarity occur only in coincidence with a bit interval *t* boundary 80 – 89. For example, in FIG. 1*d*, all positive-going transitions occur only at a boundary.

b. All bits representative of a first binary value, for example, a binary one, have a transition occurring intermediate the interval boundaries ( FIG. 1*a*).

c. All bits representative of the other or secondary binary value (binary zero) have no transitions occurring intermediate the interval boundaries, but always have at least one transition at a boundary thereof ( FIG. 1*b*).

d. Bits of the same or different binary value occurring in two contiguous bit intervals always have at least one transition of the predetermined polarity occurring at one of the interval boundaries of the contiguous bit intervals.

When a signal conforms to these characteristics, both phase and data information are readily derived therefrom. Phase information or time of occurrence of the interval boundaries is ascertained by determinating the time of occurrence of those transitions having the predetermined polarity. No other phase information is required. Data information is readily derived by determining the presence or absence of a transition between the interval boundaries.

The various waveforms used in producing waveform 1*d* will now be described. Waveform 1*a* comprises a plurality of two level or pulses occurring within a bit interval *t*. It is to be understood that reference to leading and lagging edges as described herein refers to sharply rising or falling transient variations between first and second levels in a signal. The two level bit form or pulse being defined by the transient variation of voltage or current of short duration having a sharp rise and decay. Each two level bit form has a leading edge 40 – 48 occurring at a separate respective interval *t* boundary 80 – 88. Each two level bit form also has a lagging edge 50 – 58 occuring intermediate the respective bit interval boundaries, 80 and 81, 81 and 82, and so forth. Lagging edges 50 – 58 may occur anywhere within the bit interval *t*, but are here shown equally spaced intermediate the bit interval boundaries 80 – 88. Of course, as will be appreciated, the lagging edges 50 – 58 could occur at the boundaries 80 – 88 and the leading edges 40 – 48 therebetween, the occurrence of the leading edges at the boundaries being illustrative only. Thus, as shown, the transitions, in waveform 1*a* occurring at a bit interval boundary always have the same polarity. Waveform 1*a* arbitrarily manifests one of two binary values: for example, a binary one.

Waveform 1*b*, which includes the remaining bit forms forming the encoded waveform 1*d*, comprises a plurality of rectangular waveforms each having its corresponding leading edge 60 – 64 occurring at a respective different one of boundaries 80 – 88 while the corresponding lagging edges thereof 65 – 69, each occur at a respective different one of boundaries 81 – 89. The leading and lagging edges of each bit form thereof occur at adjacent boundaries. Thus, each bit form of waveform 1*b* has its respective leading and lagging edges occurring substantially in coincidence with one of interval boundaries 80 – 89.

Unlike waveform 1*a*, each bit form of waveform 1*b*, exhibits no transitions within a bit interval *t*. Waveform 1b manifests the other binary value, for example, a binary zero, and it is the absence of a transition within the bit interval *t* which represents this other binary value. Note that in waveform 1*b*, at least alternate bit interval boundaries have a transition occurring in coincidence therewith of the same polarity as the transitions of waveform 1*a* occurring in coincidence with the interval boundaries. In both waveforms 1*a* and 1*b*, bit intervals *t* are of equal duration, and are contiguous.

Now with reference to waveform 1*d*, it is seen that each binary one is manifested by a bit form which is the same as those occurring in waveform 1*a*, and each binary zero is manifested by a bit form which is similar to those occurring in waveform 1*b*. Waveform 1*c* is a control signal which determines which one of the bit forms of waveforms 1*a* or 1*b* are selected in forming the waveform 1*d*. In waveform 1*c*, each pulse 90 or a first voltage level represents a binary one and the absence of such a pulse or a second voltage level 91 represents a binary zero, and for each of pulses 90 of waveform 1*c*, there occurs a bit form 1*a* in waveform 1*d*, and in the absence of pulse 90 in each of corresponding intervals *t*, there occurs a bit form 1*b* in waveform 1*d*. Thus, in one arrangement, waveform 1*d* is formed by separately providing signals 1*a* and 1*b*, and selectively combining the signals in accordance with the binary values manifested by the control signal 1*c*.

The significance to be attached to the code of FIG. 1*d* is that each bit interval carries data information and at least alternate interval boundaries carry phase synchronizing information. This phase information is referred to as absolute phasing, and is derived from the polarity of the transitions occurring at the interval boundaries. Since the polarity of transitions occurring at interval boundaries of waveform 1*a* can be predetermined and since at least alternate transitions of waveform 1*b* will also be of the same polarity as the predetermined polarity, the identification of the interval boundaries can readily be ascertained upon determination of the time of occurrence of the transitions of the predetermined polarity. This is in contradistinction to the prior art codes which usually require the insertion of additional phase information into the data signal.

Figure 2:
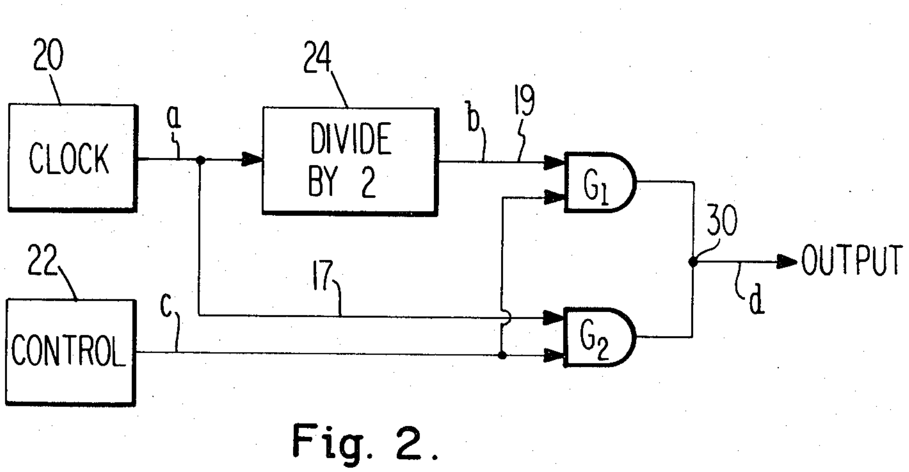
FIG. 2 is a diagram of a circuit utilized to generate the binary encoded waveforms of FIG. 1.

To derive waveform 1*d*, the illustrative diagram of FIG. 2 will now be described. In FIG. 2, the letters *a*, *b*, *c*, and *d* refer to the presence of the corresponding waveforms of FIG. 1 at the locations indicated. Clock 20 is coupled to output terminal 30 through divide by two circuit 24, which may be a conventional bi-stable multivibrator to gate $G_1$ along lead 19 and by way of gate $G_2$ along lead 17. Control signal generator 22 is coupled to gates $G_1$ and $G_2$ for selectively determining which of waveforms 1*a* and 1*b* are passed to terminal 30. Gates $G_1$ and $G_2$ are conventional but dissimilar gates. Control 22 may be any source of binary waves such as waveform 1*c*, which could be a data information signal, or the like.

Typical pulse 90 of waveform 1*c* has a voltage level 93 following leading edge 95 thereof which level manifests a first binary vale, while voltage level 91 manifests a second binary value as described above. Leading edge 95 is shown occurring at interval boundary 80, but in practice need not occur in coincidence therewith in order to control the passing of waveforms 1*a* or 1*b* to terminal 30 as will be readily appreciated.

When leading edge 95 of pulse 90 is received by gates $G_1$ and $G_2$, gate $G_1$ is disabled, and gate $G_2$ is enabled. With gate $G_2$ enabled, waveform 1*a* is passed to common terminal 30. Pulse 90 in conjunction with waveform 1*a*, controls the state of gates $G_1$ and $G_2$ during bit interval t bounded by boundaries 80 and 81. At boundary 81, the presence of voltage level 91 in conjunction with leading edge 60 – 64 of the bit forms of waveform 1*b* disables gate $G_2$ and enables gate $G_1$ for the duration of an interval *t*, which immediately causes the leading edge 60 of the rectangular bit form of waveform 1*b* occurring at boundary 81 to be passed to terminal 30. As long as waveform 1*c* stays at level 91, then waveform 1*b* is passed to terminal 30. When pulse 97 of waveform 1*c* occurs, then gate$G_2$ is enabled and gate gate $G_1$ is disabled and the process described is repeated.

Thus, whenever a binary one is manifested by waveform 1*c*, a bit form of waveform 1*a* is applied to output terminal 30, and whenever, a binary zero is manifested thereby, a bit form of waveform 16 is applied to terminal 30. For every bit interval *t*, one or the other of bit forms 1*a* or 1*b* will occur therein.

Figure 3:
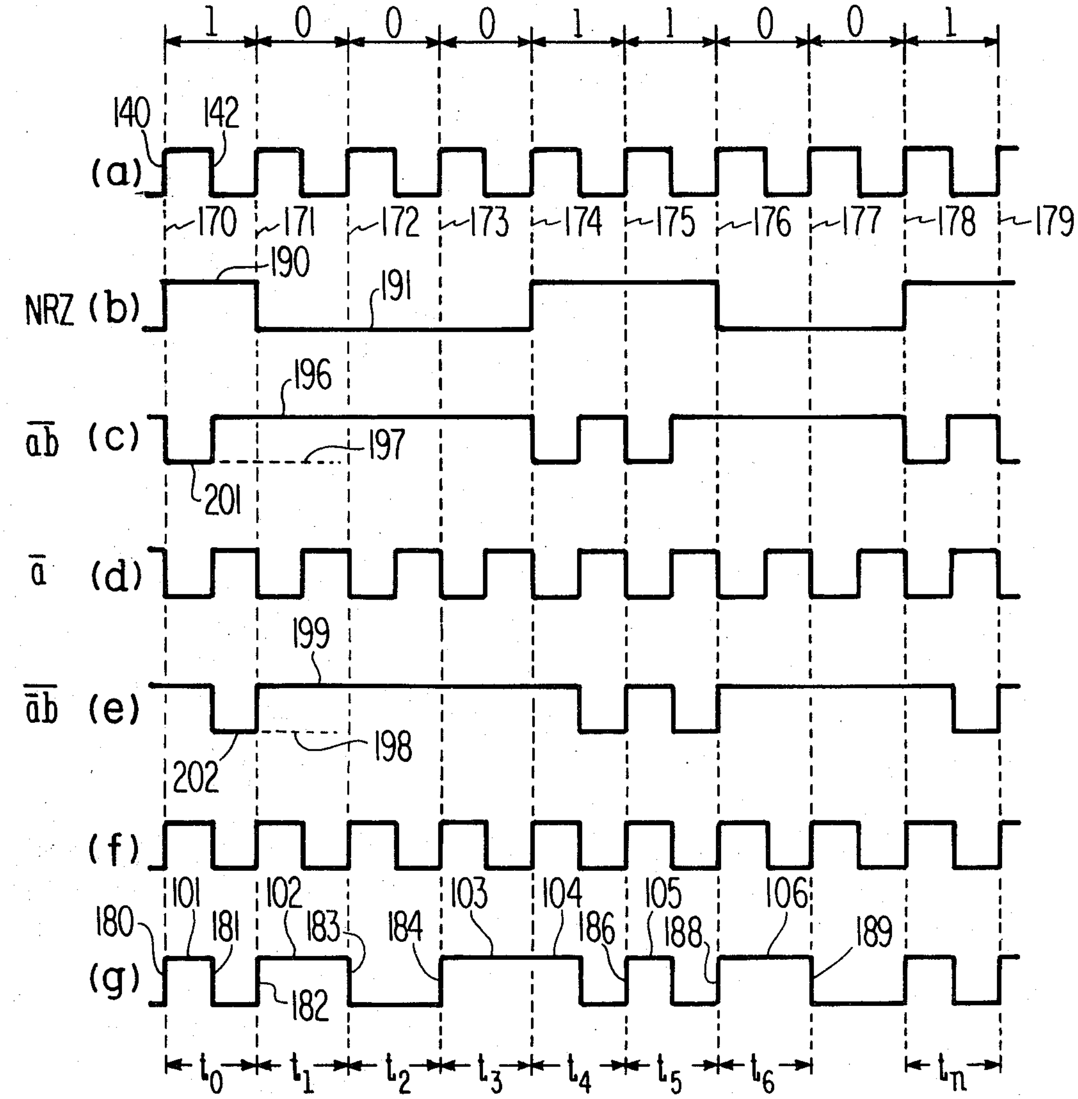
FIG. 3 is a chart of waveforms including intermediate waveforms in which a non-return-to-zero (NRZ) binary encoded control signal is utilized to generate a binary encoded signal which is self-clocking and absolute phasing similar to the code generated in FIG. 1.
Figure 4:
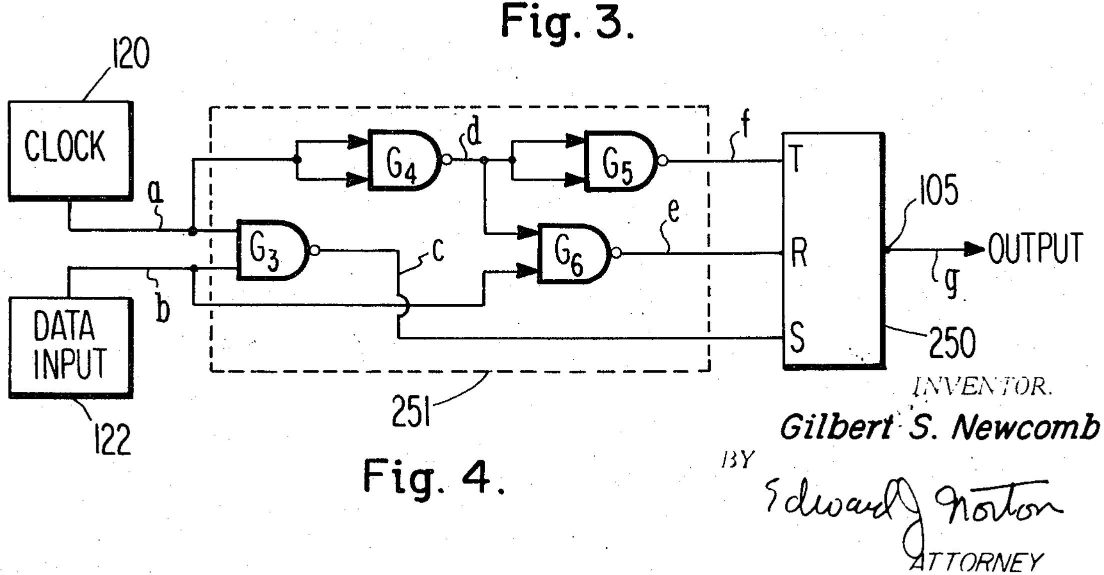
FIG. 4 is a diagram of a circuit which is utilized for generating the waveforms of FIG. 3.

A second embodiment of code generator according to the present invention is illustrated by FIGS. 3 and 4. The waveforms of FIG. 3 show the derivation of a binary encoded waveform similar to that of FIG. 1*d*, but this time utilizing a non-return-to-zero (NRZ) binary encoded input control signal. Waveforms 3*a* and 3*g* are similar to waveforms 1*a* and 1*f*, respectively. However, the remaining waveforms of FIG. 3 are intermediate waves utilized to derive the encoded waveform of 3*g*. In this instance, the bit forms of waveform 1*b* first appear in their desired configuration in waveform 3*g*. Suffice to say that waveform 3*g* and waveform 1*d* exhibit the basic characteristics defined above. The derivation of the various waveforms of FIG. 3 is conventional and a brief description of the circuit of FIG. 4 will now be made.

In FIG. 4, clock 120, which provides waveform 31, is coupled to gates $G_3$ and $G_4$, while data input source 122, which provides a non-return-to-zero ( NRZ) encoded signal, is coupled to gates $G_3$ and $G_6$. Gates $G_3$ and $G_6$ are respectively coupled to the set and reset inputs of multivibrator 250, which is an integrated circuit of the type 7074N manufactured, for example, by Texas Instruments, Dallas, Texas. Gate $G_4$ is coupled to the trigger and reset inputs of multivibrator 250 by way of gates $G_5$ and $G_6$, respectively. Gates $G_3$, $G_4$, $G_5$, and $G_6$ together form integrated circuit 251 of type 7400N, also manufactured by Texas Instruments, Dallas, Texas.

Clock 120 provides the waveform 3*a* which is similar to that of FIG. 1*a*. Input source 122 provides the NRZ signal of FIG. 3*b*. In FIG. 3*b*, a first voltage level 190 manifests one binary value and a second voltage level 191 manifest the other binary value, for example, a binary one and zero, respectively. Thus, for every bit interval *t* in which waveform *b* is at level 190, a two level bit form will be provided at output terminal 105 of multivibrator 250, the two level bit form being of similar configuration as the bit form of FIG. 1*a* described previously ( a binary one). In this instance, these two level bit forms are the same as those of FIG. 3*a*. Secondly, for every bit interval $t_0$–$t_n$ in which waveform *b* is at level 191, a rectangular waveform will be provided at output terminal 105 of multivibrator 250, the rectangular waveform being of similar configuration as the bit forms of FIG. 1*b* ( a binary zero).

Derivation of the binary one bit form of the waveform of 3*g* at terminal 105 will now be described. Gate $G_3$ performs the operation $\overline{a\ b}$. This results in a low signal 201 at level 197 of FIG. 3*c* whenever waveform 3*a* is high for all bit forms of waveform 3b occurring in a bit interval *t* at level 190. Signal 201 is a set signal for multivibrator 250 and overrides any trigger input signal applied to multivibrator 250 from gate $G_5$. This low signal causes the occurrance of pulse 101 of waveform 3*g* having a leading edge 180 occurring in coincidence with interval boundary 170. Gate $G_4$ inverts waveform 3*a* to form the waveform 3*d* which is the operation $\overline{a}$. Gate $G_6$ produces the waveform of 3c which is the operation $\overline{\overline{a}\ b}$. That is, the output of gate $G_6$is low, at level 198, whenever waveform 3*a* is low for all bit forms of waveform 3b occurring in a bit interval *t* at level 190. This is a reset signal for multivibrator 250 and overrides any trigger input signal applied to multivibrator 250 from gate $G_5$. This latter low signal causes a transition in bit interval $t_0$ intermediate the interval boundaries 170 – 171. Thus, whenever level 190 of waveform 3*b* is present ( a binary one, for example) in a bit interval, the output waveform 3*g* in that bit interval will always be a bit form such as pulse 101.

Derivation of the binary zero bit form will now be shown. First, for the embodiment illustrated, the set and reset inputs must be high for a zero to be produced, that is, waveform 3*c* and 3*e* must be at levels 196 and 199, respectively. Under these conditions, waveform 3*f* triggers multivibrator 250 for each positive transition thereof, which, as shown, occur in coincidence with interval boundaries 170 – 179. Gate $G_5$ inverts the waveform 3d to reform the clock waveform of 3*a*. Multivibrator 250 divides waveform 3*f* by two and applies the divided signal to terminal 105. When compared to waveform 1*b*, it can be seen that the bit form of 3*g* manifesting a binary zero is similar. In this instance, however, the binary zero manifested by bit forms 102, 103 and 104, only occur in the circuit when control signal 3*b* is actually at the binary zero level 191, rather than as a continuous independent wave as shown by FIG. 1*b*.

Note that in waveform 3*g* at least alternate interval boundaries exhibit a transition of a predetermined polarity: for example, positive going. Also, note that in pulse 103 of waveform 3*g*, a zero and a successive one occurring in bit intervals $t_3$ and $t_4$ may have the same voltage level with no transition occurring at the intermediate interval boundary 174. Thus, two successive transitions 184 and 186 of the same polarity occur at alternate successive boundaries 173 and 175. The same result arises for successive binary zeros as shown between boundaries 171 – 173 and 176 – 178.

What is claimed is:

1. A method of generating a binary encoded signal of the type representative of a series of bits each occurring during a separate one of contiguous intervals of equal duration, comprising the steps of:

providing solely for each interval a first pulse having sharply rising and falling transient variations occurring between first and second levels, each of the first pulses of all said intervals having the same given one of either said rising or falling transient variations occurring substantially in coincidence with an interval boundary corresponding to the interval for which that pulse is provided, each of said first pulses further having the other of said transient variations occurring intermediate the boundaries of the same corresponding interval, providing solely for each interval a second pulse having sharply rising and falling transient variations occurring between first and second levels, each of said second pulses for all said intervals having the respective rising and falling transient variations occurring substantially in coincidence with the interval boundaries corresponding to the interval for which that second pulse is provided, and selectively coupling either said first pulse or said second pulse one at a time to a common terminal in accordance with the preselected binary value manifested by the corresponding one of said bits to form an output signal in which a separate one of said first and second pulses occurs during each of said contiguous intervals in accordance with the binary value manifested by the corresponding bit of said series of bits, whereby all the transitions having the polarity of said given one transient variation occur in coincidence with only the bit cell boundaries.

2. The method of claim 1 wherein said providing steps comprise the steps of generating a train of timing pulses, each pulse of which occurs during a corresponding interval of said encoded signal, converting each of said timing pulses into one of said first pulses, and converting said timing pulses into said second pulses.

3. The method of claim 2, wherein said timing pulses and said first pulses are substantially the same.

4. A method of generating a binary encoded signal of the type representative of a series of bits each occurring during a separate one of contiguous intervals of equal duration, comprising the steps of:

providing solely for each interval a first pulse having sharply rising and falling transient variations occurring between first and second levels, each of the first pulses of all said intervals having the same given one of either said rising or falling transient variations occurring substantially in coincidence with an interval boundary corresponding to the interval for which that pulse is provided, each of said first pulses further having the other of said transient variations occurring intermediate the boundaries of the same corresponding interval, dividing said first pulse by two for deriving solely for each interval a second pulse having sharply rising and falling transient variations occurring between first and second levels, each of said second pulses for all said intervals having the respective rising and falling transient variations occurring substantially in coincidence with the interval boundaries corresponding to the interval for which that second pulse is provided, and selectively coupling either said first or said second pulses one at a time to a common terminal in accordance with the preselected binary value manifested by the corresponding one of said bits whereby all transitions having the polarity of said given one transient variation occur only in coincidence with the bit cell boundaries.

5. The process according to claim 11 wherein said selective coupling step includes gating said first and second pulses to said terminal in response to a binary signal manifesting data to be encoded.

6. A code generator for generating at an output terminal thereof a binary encoded signal of the type representative of a series of bits each occurring during a separate one of contiguous intervals of equal duration in response to timing pulses of a binary control signal applied thereto, each of said bits manifesting one of two given binary values, said generator comprising:

means responsive to one value of said binary control signal and to said timing pulses applied thereto for generating at said output terminal a first pulse manifesting said one binary value, said first pulse having sharply rising and falling transient variations occurring between first and second levels, each of the first pulses of all said intervals having the same given one of either said rising or falling transient variations occurring substantially in coincidence with an interval boundary corresponding to the interval for which that pulse is provided, each of said first pulses further having the other of said transient variations occurring intermediate the boundaries of the same corresponding interval, each first pulse corresponding solely to a separate, different interval, and means responsive to the other value of said binary signal and said timing pulses applied thereto for generating at said output terminal a second pulse manifesting the other of said given values, said second pulse having sharply rising and falling transient variations occurring between first and second levels, each of said second pulses for all said intervals having their respective rising and falling transient variations occurring substantially in coincidence with the interval boundaries corresponding to the interval for which that second pulse is provided, each second pulse corresponding solely to a separate, different interval, whereby all transitions having the polarity of said given one transient variation occur in coincidence with only the bit cell boundaries.

7. The generator of claim 6 wherein said other transient variations of said first pulse occur in substantially equal time spaced relationship with each of the respective boundaries of that corresponding interval, said second pulse generating means including means for dividing said applied timing bits by two.

8. A code generator for generating a self clocking binary encoded signal of the type representative of a series of bits each occurring during a separate one of contiguous intervals of equal duration utilizing an applied binary information input signal and an accompanying stream of timing pulses of the type having sharply rising and falling transient variations occurring between first and second levels, and the same given one of either said rising or falling transient variations occurring substantially in coincidence with an interval boundary corresponding to the interval in which only that pulse occurs, each of said timing pulses further having the other of said transient variations occurring intermediate the boundaries of the same corresponding interval, comprising:

a bistable multivibrator responsive to either of said rising or falling transient variations of each of said applied timing pulses occurring at said boundary for generating solely for each interval a substantially rectangular waveform having both its rising and falling transient variations occurring substantially in coincidence with the respective boundaries of the interval corresponding to that applied timing pulse, first gate means responsive to said input signal and said rectangular waveform applied thereto, said gate means passing said rectangular waveform to an output thereof when said input signal manifests one given value, second gate means responsive to said applied input signal and timing pulses for passing said timing pulses to an output thereof when said input signal manifests a second given value, and means for coupling said first and second gate outputs to a common terminal, each said rectangular waveform corresponding to one given binary value of said input signal and each said timing pulses corresponding to the other binary value, whereby all transient variations having the polarity of said given one transient variation occur in coincidence with only the bit cell boundaries.

* * * * *